US006379644B2

(12) United States Patent
Torata et al.

(10) Patent No.: US 6,379,644 B2
(45) Date of Patent: Apr. 30, 2002

(54) PROCESS FOR PRODUCING A POSITIVE ELECTRODE ACTIVE MATERIAL FOR A NONAQUEOUS SECONDARY BATTERY AND A NONAQUEOUS SECONDARY BATTERY USING THE ACTIVE MATERIAL

(75) Inventors: Naoto Torata, Kashihara; Takehito Mitate, Yamatotakada; Toyoshi Iida, Fukui; Tetsushi Makino, Fukui; Shigeyuki Hamano, Fukui; Tomohiko Inada, Osaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/410,072

(22) Filed: Oct. 1, 1999

(30) Foreign Application Priority Data

Oct. 2, 1998 (JP) ............................................. 10-281433

(51) Int. Cl.[7] ......................... C01G 49/00; H01M 4/32; H01M 4/58
(52) U.S. Cl. ..................... 423/594; 429/223; 429/231.1
(58) Field of Search ................................. 423/594, 595, 423/598, 599, 179.5; 429/219, 220, 221, 223, 224, 225, 229, 231.5, 231.1

(56) References Cited

U.S. PATENT DOCUMENTS

| | | | |
|---|---|---|---|
| 5,630,994 A | * | 5/1997 | Boyle et al. ................. 423/594 |
| 5,677,087 A | * | 10/1997 | Amine et al. ................ 429/224 |
| 5,686,203 A | * | 11/1997 | Idota et al. .................. 429/194 |
| 5,738,957 A | * | 4/1998 | Amine et la. ................ 429/223 |
| 5,742,070 A | * | 4/1998 | Hayashi et al. ........... 252/182.1 |
| 5,820,790 A | * | 10/1998 | Amine et la. ............. 252/519.1 |
| 5,981,106 A | * | 11/1999 | Amine et la. ................ 429/224 |
| 5,985,488 A | * | 11/1999 | Mitate et al. ................ 429/223 |
| 6,015,637 A | * | 1/2000 | Mitate et al. .............. 429/231.1 |
| 6,024,934 A | * | 2/2000 | Amine et al. ................ 423/592 |
| 6,077,496 A | * | 6/2000 | Ito et al. ..................... 423/594 |
| 6,103,421 A | * | 8/2000 | Torata et al. ................ 429/223 |

FOREIGN PATENT DOCUMENTS

| | | |
|---|---|---|
| JP | 63-59507 B2 | 11/1988 |
| JP | 2-40861 A | 2/1990 |
| JP | 6-203834 A | 7/1991 |
| JP | 4-181660 A | 6/1992 |
| JP | 5-205741 A | 8/1993 |
| JP | 5-251079 A | 9/1993 |
| JP | 6-44970 A | 2/1994 |
| JP | 6-96769 A | 4/1994 |
| JP | 7-307165 A | 11/1995 |
| JP | 08298115 A | * 11/1996 |
| JP | 9-156931 A | 6/1997 |
| JP | 10-106564 A | 4/1998 |

OTHER PUBLICATIONS

Dyer et al, Alkali Metal–Nickel Oxides of the Type $MNiO_2$; J. Am. Chem. Soc., 76, Mar. 20, 1954, pp. 1499–1503.
Ohzuku et al., "Synthesis and Characterization of $LiNiO_2$ ($R3_{IN}$) For Rechargeable Nonaqueous Cells", Chemistry Express, Kinki Chemical Society of Japan, vol. 6, No. 3, 1991, pp. 161–164.

* cited by examiner

Primary Examiner—Steven P. Griffin
Assistant Examiner—Cam N. Nguyen
(74) Attorney, Agent, or Firm—Nixon & Vanderhye (57) ABSTRACT

A process for producing a positive electrode active material for a nonaqueous secondary battery comprising the steps of: dissolving, in an alcohol as a medium, a starting material which contains metals necessary for giving a compound represented by the formula $LiNi_{1-x}M_xO_2$, wherein $0 \leq X < 0.5$ and M is at least one metal selected from transition metals and 3B-, 4B- and 5B-group elements, as a positive electrode active material, and which is soluble in the alcohol; adding a sufficient amount of oxalic acid to the resulting solution to produce a precipitate slightly soluble in the alcohol: separating the slightly soluble precipitate from the solution: and calcining the precipitate to obtain the positive electrode active material.

14 Claims, 5 Drawing Sheets

PROCESS FOR PRODUCING A POSITIVE ELECTRODE ACTIVE MATERIAL FOR A NONAQUEOUS SECONDARY BATTERY AND A NONAQUEOUS SECONDARY BATTERY USING THE ACTIVE MATERIAL

CROSS-REFERENCE TO RELATED APPLICATION

This application is related to Japanese application No. HEI 10-281433 filed on Oct. 2, 1998, whose priority is claimed under 35 USC §119, the disclosure of which Is incorporated by reference in its entirety.

BACKGROUND OF THE INVENTION

1. Field of the Invention

The present invention relates to a process for producing a positive electrode active material for a nonaqueous secondary battery and also relates to a nonagueous secondary battery. More particularly, the invention relates to a process for producing a positive electrode active material for a nonaqueous secondary battery, the active material being represented by the formula, $LiNi_{1-x}M_xO_2$ wherein $0 \leq X < 0.5$ and M is at least one element selected from transition metals, group 3B elements, group 4B elements and group 5B elements, and a nonaqueous secondary battery with use of a positive electrode including at least one kind of positive electrode active material produced by the process.

2. Description of Related Art

With reduction of the size, the weight and the power consumption of electronic equipment and like devices, progress has been made in research and development of secondary batteries using alkali metals such as lithium which are lightweight and able to generate high voltage. Now lithium ion secondary batteries using carbon or graphite for a negative electrode active material and lithium cobalt oxide for the positive electrode active material are in practical use.

In the case where lithium cobalt oxide is used for the positive electrode active material, there is a problem that raw material costs are high because cobalt resources are limited. Accordingly, since John Banister Goodenough et al proposed lithium nickel oxide ($LiNiO_2$) using nickel whose resources are more abundant than the cobalt resources and which is available at a lower cost (see Japanese Patent Publication No. SHO 63(1988)-59507), active research have been made on positive electrode active materials containing lithium nickel oxide.

The following processes have been reported for production of lithium nickel oxide:

(1) A process of calcining anhydrous lithium hydroxide together with a metal nickel in an atmosphere of oxygen (see J.Am.Cher.Soc., 76, 1499(1954));

(2) A process of mixing $LiOH.H_2O$ and NiO, calcining the mixture at 600° C. in an atmosphere of air, pulverizing it, and then calcining it again at 600° C. to 800° C. (see Japanese Unexamined Patent Publication No. HEI 2(1990)-40861);

(3) A process of calcining a mixture of a compound as a lithium source and a compound as a nickel source at 600° C. to 800° C. (preferably at 800° C. for six hours twice) (see Japanese Unexamined Patent Publication No. HEI 4(1992)-181660);

(4) A process of mixing lithium peroxide ($Li_2 O_2$) and nickel oxide (NiO), allowing the mixture to react at a temperature not higher than 750° C. and then quenching the mixture from that temperature (see Japanese Unexamined Patent Publication No. HEI 5(1993)-205741); and (5) A process of mixing lithium nitrate with at least one of nickel hydroxide and nickel oxyhydroxide and calcining the mixture at 500 to 1,000° C. (see Japanese Unexamined Patent Publication No. HEI 5(1993)-251079).

In these processes, a lithium source compound and a nickel source compound are mixed in the state of solid and then calcined.

As another process, there is proposed a process of dissolving nickel acetate and lithium acetate in ethylene glycol with heating, further heating the mixture to set It up, thermally treating the resulting substance at 400° C. in air, pulverizing it, calcining it in an oxidizing flow at 700° C. and then calcining it at 800° C. in an oxidizing flow (see Japanese Unexamined Patent Publication No. HEI 6(1994)-203834).

Further, known are the following processes for uniformly mixing a lithium compound and a nickel compound to facilitate the production of the positive electrode active material:

(a) A process of equimolarly mixing an aqueous solution of lithium hydroxide of 4.5 mol/L and an aqueous solution of nickel nitrate of 1.0 mol/L at 60° C., stirring the resulting mixture, drying it under reduced pressure, pulverizing the resulting matter, preliminarily calcining the pulverized matter at 300° C. and thereafter subjected to a major calcination at 800° C. (see Chemistry Express, 6, 161(1991));

(b) A process of obtaining $LiCo_xNi_{1-x}O_2$ ($0 \leq X \leq 0.5$) by dissolving a nickel salt. a lithium salt and an optional cobalt in a solvent and wet-mixing the resulting mixture, followed by calcination (see Japanese Unexamined Patent Publication No. HEI 5(1993)-325966);

(c) A process of mixing a water-soluble nickel salt and a water-soluble lithium salt in an aqueous solution, solidifying by drying the resulting mixture and calcining the resulting cake-like matter at 600° C. to 800° C.;

(d) A process of kneading by stirring a powdery nickel compound slightly soluble or insoluble in water with an aqueous solution of a water-soluble lithium salt, solidifying by drying the resulting mixture and calcining the resulting cake-like matter at 600° C. to 800° C. (see Japanese Unexamined Patent Publication No. HEI 6(1994)-44971):

(e) A process of weighing a lithium source and a nickel source in a molar ratio of 1:1 in terms of nickel and lithium, sufficiently mixing them with a little amount of water as a dispersant, followed by drying, and calcining the resulting mixture at 650° C. in an atmosphere (see Japanese Unexamined Patent Publication No. HEI 6(1994)-96768);

(f) A process of dispersing a nickel compound in a solution of lithium nitrate, volatilizing the solvent, and calcining the resulting mixture of lithium nitrate and the nickel compound in an atmosphere containing oxygen (see Japanese Unexamined Patent Publication No. HEI 7(1995)-307165);

(g) A process of weighing a powdery nickel oxide and a lithium compound, i.e., either lithium hydroxide or lithium nitrate, in a molar ratio of 1:1 in terms of lithium and nickel, melting the lithium compound at a temperature of its melt temperature or higher and 500° C. or lower, allowing the powdery nickel oxide to soak into the melted lithium compound, and calcining the resulting matter in the presence of oxygen or a gas containing oxygen in a high content (see Japanese Unexamined Patent Publication No. HEI 9(1997)-156931);

A process of dissolving a nickel compound and a lithium compound in an aqueous solution, adding oxalic acid to produce a nickel salt and a lithium salt as precipitates at a time, and calcining the precipitates (see Japanese Unexamined Patent Publication No. HEI 10(1998)-106564).

In the case of the above-mentioned processes (1) to (5), there is a problem that the mixture before calcination is not uniform.

In the case where ethylene glycol is used as a solvent, there are problems that reaction time period is long and that the production process is complicated.

In the case of the above-mentioned processes (a) to (c), the mixed state of nickel and lithium is somewhat improved compared with cases where they are mixed in a solid state. However, the uniformity of the mixture is still insufficient.

In the case of the above-mentioned processes (d) to (f), there Is a problem that the mixture is not uniform when water or a solvent as a dispersant is removed. Further, uniformity is insufficient even though a melted salt is mixed as in the above described (g).

Also, a positive electrode active material produced by any of the above-mentioned processes has a problem that, when it is used for producing a positive electrode, the active material deteriorates rapidly and good cycle characteristics cannot be obtained.

In the case of the above-mentioned process (h), since lithium and nickel are precipitated as composite oxalates, a slightly soluble precipitate in which lithium and nickel are uniformly mixed is obtained. However, since lithium oxalate is more soluble in water than other oxalates, the reproducibility of the mixed state is not sufficient. Accordingly, although a positive electrode containing lithium nickel oxide obtained by calcining this precipitate exhibits improved initial electrode characteristics and good cycle characteristics, there is a problem that an active material having stable characteristics cannot be obtained.

Also every time when the slightly soluble precipitate is prepared, the lithium salt as a raw material is required in an amount about several times to about ten times larger than the amount of lithium finally contained in the slightly soluble precipitate. Accordingly, there are problems that raw material costs are high and the lithium salt is wastefully used from the viewpoint of resources.

SUMMARY OF THE INVENTION

During study for solving the above problems, the inventors of the present invention have found that a precipitate comprised of oxalates containing a composite oxalate in which the ratio of Li:Ni is close to that of starting compounds and lithium and nickel are uniformly mixed and which Is slightly soluble in an alcohol is produced by a co-precipitation process wherein a lithium compound and a nickel compound as starting compounds are dissolved and then oxalic acid is added to the resulting mixture, and have achieved the present invention.

Accordingly, the present invention provides a process for producing a positive electrode active material for a nonaqueous secondary battery comprising the steps of: dissolving. in an alcohol as a medium, a starting material which contains metals necessary for giving a compound represented by the formula $LiNi_{1-x}M_xO_2$, wherein $0 \leq X < 0.5$ and M is at least one metal selected from transition metals and 3B-, 4B- and 5B-group elements, as a positive electrode active material, and which is soluble in the alcohol; adding a sufficient amount of oxalic acid to the resulting solution to produce a precipitate comprised of oxalates including a composite oxalate slightly soluble in the alcohol: separating the precipitate comprised of oxalates including the composite oxalate slightly soluble In the alcohol from the solution: and calcining the precipitate thereby to obtain the positive electrode active material.

The production of the precipitate comprised of oxalates including the slightly soluble composite oxalate improves uniformity of a mixed state of the substance before calcination and facilitates control of the ratio of lithium to nickel, Li:Ni, in the precipitate comprised of oxalates containing the slightly soluble composite oxalate. Furthermore, since lithium oxalate is slightly soluble in an alcohol, it is easy to produce the precipitate comprised of oxalates including the slightly soluble composite oxalate containing lithium and nickel, from starting compounds. Thus, it has been found that the process of the present invention Is excellent also from the viewpoint of stability of manufacturing process and costs.

In another aspect, the present invention provides a nonagueous secondary battery with use of a positive electrode including a positive electrode active material produced by the above-described process.

It has been found that the above-mentioned nonaqueous secondary batter has improved initial electrode characteristics and good cycle characteristics.

These and other objects of the present application will become more readily apparent from the detailed description given hereinafter. However, it should be understood that the detailed description and specific examples. while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The present invention is now explained along its production steps.

First, the starting material which contains metals necessary for giving a compound represented by the formula $LiNi_{1-x}M_xO_2$ wherein $0 \leq X < 0.5$ and M is at least one metal selected from transition metals and 3B-, 4B- and 5B-group elements as a positive electrode active material and which is soluble in a alcohol is dissolved in the alcohol as a medium.

The alcohol is not particularly limited provided that it dissolves the starting material for a positive electrode active material. In the alcohol, lower aliphatic alcohol is preferable. As more preferable alcohols, primary alcohols such as methanol and ethanol may be mentioned. Particularly, ethanol is preferred from the view point of safety As regards the purity of the alcohol, it is preferable to use an alcohol which is anhydrous or substantially does not contain any water (e g., having a purity of 98% or more). However, in the case where the positive electrode active material is produced in an industrial scale, the alcohol may contain about 20 wt % or less of water provided that the characteristics of the positive electrode active material to be obtained is not adversely affected.

As the starting material, Inorganic or organic nickel and lithium compounds may be mentioned.

As the nickel compound, it is preferable to use a nickel compound having a high solubility in the above-described alcohol. Examples thereof include nickel chloride, nickel perchlorate, nickel bromide, nickel iodide, nickel nitrate, nickel acetate and hydrates of these compounds. Especially, where ethanol is used, nickel nitrate, nickel chloride and nickel acetate are preferable.

As the lithium compound, it is preferable to use a lithium compound having a high solubility in the above-described alcohol. Examples thereof include lithium chloride, lithium bromide, lithium iodide, lithium chlorate, lithium perchlorate lithium sulfide, lithium hydrogensulfide, lithium nitrate, lithium acetate and hydrates of these compounds. Especially, lithium nitrate, lithium chloride and lithium acetate are preferable since they are unlikely to remain as impurities after the final calcination.

Besides the above nickel and lithium compounds, a compound containing a transition metal or a 3B-, 4B- or 5B-group element (referred to as a third compound herein after) is optionally dissolved as the starting compound in the alcohol. For example the third compound is preferably a compound of Mn, Fe, Co, Cu, Zu, Y, La, Al or Sn, from the viewpoint of performance of a battery. Particular examples include manganese chloride, manganese nitrate, manganese acetate, Iron chloride, iron bromide, iron Iodide, iron nitrate, cobalt chloride, cobalt bromide, cobalt iodide, cobalt nitrate, cobalt acetate, copper nitrate, copper acetate, zinc chloride, zinc bromide, zinc iodide, zinc nitrate, zinc acetate, yttrium chloride, yttrium bromide, yt trium iodide, yttrium nitrate, lanthanum chloride, lanthanum bromide, lanthanum nitrate, lanthanum acetate, aluminum chloride, tin chloride, tin bromide and hydrates of these compounds.

In the case where only the nickel compound and the lithium compound are used, they are dissolved in the alcohol so that the molar ratio of nickel to lithium, Ni:Li, is 1:0.7 to 1:3.0, preferably. If the ratio of lithium is smaller than 1: 0.7, the amount of lithium in the precipitate comprised of oxalates containing a slightly soluble composite oxalate becomes smaller, and it becomes impossible to obtain $LiNIO_2$ after calcination. Therefore, it is not preferable. If the ratio of lithium is larger than 1:3.0, $LiNIO_2$ can be obtained after calcination but a lot of impurities are also generated. Therefore, it is not preferable. More preferably, the molar ratio of nickel to lithium is 1:1 to 1:1.5 for obtaining better characteristics.

In the case where the third compound is also used, the third compound is dissolved in the alcohol so that the molar ratio of the sum of the transition metal or the 3B-, 4B- or 5-B element and nickel in the third compound and the nickel compound with respect to lithium in the lithium compound, i.e., (Ni+M): Li, is 1:0.7 to 1:3.0, i.e., Li / (Ni+M) is 0.7 to 3.0, preferably. If the amount of lithium is smaller, it is difficult to obtain $LiNi_{1-x}M_xO_2$ after calcination. Therefore, it is not preferable. If the amount of lithium is larger, $LiNi_{1-x}M_xO_2$ can be obtained after calcination but a lot of impurities are also generated. Therefore, it is not preferable. More preferably, the molar ratio of (Ni+M):Li may be 1:1 to 1:1.5, i.e., Li / (Ni+M) is 1 to 1.5, for obtaining better characteristics. If the amount of M is large, it becomes difficult to obtain crystals. Therefore, it is not preferable.

Next, a sufficient amount of oxalic acid is added to the resulting solution in which the starting compounds are dissolved, thereby to produce a precipitate comprised of oxalates containing a composite oxalate slightly soluble In the alcohol as a solvent. Here, the sufficient amount may be set as appropriate depending upon the solubility of the starting compounds in the alcohol. However, this amount is preferably set as small as possible for reducing a production time period. More particularly, oxalic acid is preferably added in a molar ratio of 1.3 to 2.5 with respect to the sum of nickel and the transition metal or 3B-, 4B- or 5B-group element of the third compound dissolved in the alcohol. If the ratio of oxalic acid is smaller than 1.3, it becomes difficult to control the ratio of lithium to nickel and the transition metal or the 3B-. 4B- or 5B-group element in the precipitate comprised of oxalates containing a slightly soluble composite oxalate and to obtain $LiNi_{1-x}M_xO_2$ after calcination. Therefore, it is not preferable. If the ratio of oxalic acid is larger than 2.5, $LiNi_{1-x}M_xO_2$ can be obtained after calcination but a lot of impurities are also generated. Therefore, it is not preferable.

The precipitate is considered to be composed of oxalates of nickel, lithium and the transition metal or the 3B-, 4B- or 5B-group element, a composite oxalate of nickel, lithium and the transition metal or the 3B-, 4B- or 5B-group element, and mixtures of these oxalates.

Oxalic acid may be added either in a solid sate or in the form of a solution. In the case of solid oxalic acid, it is easy to control the production of the precipitate composed of oxalates containing a slightly soluble composite oxalate. In the case of the solution, it is possible to obtain finer particles of the precipitate by adding a solution of oxalic acid in an alcohol.

Next, the precipitate composed of oxalates containing a slightly soluble composite oxalate is separated and calcined to obtain a positive electrode active material.

The precipitate composed of oxalates containing a slightly soluble composite oxalate may be separated, for example, by filtration, centrifugation or the like. Besides, the alcohol may be separated by distillation from the solution after the above-mentioned separation of the precipitate and recycled for use in the production of a positive electrode active material, thereby to reduce production costs.

Further, the precipitate composed of oxalates containing a slightly soluble composite oxalate, after being separated but before being calcined, may be subjected to a drying process for substantially removing the alcohol.

Subsequently, the precipitate composed of oxalates containing a slightly soluble composite oxalate is subjected to calcination. Calcining temperature is preferably within the range of 650° C. to 900° C., more preferable 700° C. to 800° C. The calcination is preferably carried out in air (volume fraction of oxygen is about 20%) or in an atmosphere having a higher volume fraction of oxygen than air. The atmosphere having a higher volume fraction of oxygen than air means an atmosphere having a volume fraction of oxygen of 21% to 100%, preferably 50% to 100%.

In the above-described calcination, if it is carried out at a temperature below 650° C. development of crystals slows. On the other hand, if it is carried out at a temperature above 900° C. generated crystals decompose. Therefore both cases are not preferable since the discharge capacity declines. Further, if the calcination temperature is 700 to 850° C. still better characteristics can be obtained.

If the calcination is carried out in an atmosphere having a lower oxygen concentration than air, reaction slows and crystals become difficult to develop. Accordingly, the discharge capacity declines, and therefore, it is not preferable. Where the calcination is carried out in an atmosphere of 50% to 100% of oxygen, better electrode characteristics can be obtained.

Here, before the above-mentioned calcination, it is preferable to carry out a preliminary calcination. Hereinafter, the calcination described in the foregoing paragraphs is referred to as a major calcination. Where the preliminary calcination is conducted, the crystallinity of the obtained positive electrode active material improves compared with the case without the preliminary calcination, and as a result, the electrode characteristics thereof can be improved further.

Preferably, the preliminary calcination is carried out at a temperature of 300° C. to 550° C., more preferably 350° C. to 450° C. A temperature below 300° C. is not preferable because it is lower than a pyrolytic temperature of the precipitate composed of oxalates containing a slightly soluble composite oxalate.

Further, it is preferable to pulverize the precipitate after the preliminary calcination but before the major calcination. By pulverization, reaction efficiency with oxygen at the major calcination Is improved, and crystals of the positive electrode active material become more ready to develop than in the case where pulverization is not conducted. Therefore, better electrode characteristics can be obtained by pulverization.

The nonaqueous secondary battery of the present invention usually comprises a positive electrode, a negative electrode and an ion conductor.

The positive electrode may be formed by use of a mixture of $LiNi_{1-x}M_xO_2$ ($0 \leq x < 0.5$) (a positive electrode active material) produced as described, an electric conductor, a binder and optionally, a solid electrolyte and the like.

Materials for the electric conductor are not particularly limited, and any material known in this field of art may be used. Examples thereof include carbons such as carbon black, acetylene black, Ketchen black, graphite powder (natural graphite and artificial graphite), metal powder and metallic fibers.

Materials for the binder are not particularly limited, and any materials known in the field of art may be used. Examples thereof include fluoropolymers such as polytetrafluoroethylene and polyvinylidene fluoride, polyolefins such as polyethylene, polypropylene and ethylene-propylene-diene terpolymer, and styrenebutadlene rubber.

As regards a mix ratio, the mixture preferably contains 1 to 50 parts by weight of the electric conductor and 1 to 30 parts by weight of the binder with respected to 100 parts by weight of the positive electrode active material. If the electric conductor is less than 1 part by weight, the resistance and polarization of the electrode rise. As a result, the discharge capacity decreases and it becomes impossible to prepare a practical secondary battery. Therefore, it is not preferable. If the electric conductor is more than 50 parts by weight. the amount of the active material in the electrode decreases. As a result, the discharge capacity of the positive electrode declines. Therefore, it is not preferable. If the binder is less than 1 part by weight, the mixture loses its binding power. Therefore, it is not preferable. If the binder is more than 30 parts by weight, the amount of the active material in the electrode decreases, and the resistance and polarization of the electrode rise, as in the case of the electric conductor. As a result, the discharge capacity of the positive electrode declines. Therefore, it is impractical. It is noted that the above-mentioned mix ratio may be adjusted as appropriate depending upon the kinds of the electric conductor and binder to be used.

The positive electrode may be produced by forming the above-described mixture. How to form the electrode is not particularly limited, but the mixture may be compressed into a pellet; or the mixture may be formed in an electrode by adding a proper solvent to the mixture to produce a paste, applying the paste onto a collector described below, drying and compressing it into a sheet.

Electrons are sent to and received by the positive electrode preferably through the collector. As collectors, usable are metals themselves, alloys, carbons and the like. More particularly, examples thereof include titanium, aluminum, stainless steel; copper, aluminum and stainless steel whose surface is treated with carbon, titanium and silver; and the surface-treated materials whose surface is further oxidized. The positive electrode may be in the form of a foil, film, sheet. net, punched form, lath or foam, in a perforated or porous form, in a form of fibers, or the like. The thickness is not particularly limited, but may usually be about 1 $\mu$m to about 1 mm.

As an active material contained in the negative electrode, usable is metallic lithium, a lithium alloy and/or a material capable of intercalating or deintercalating lithium. For example,metallic lithium and lithium alloys such as lithium/aluminum alloy, lithium/tin alloy, lithium/lead alloy and Wood's alloys may be mentioned. In addition to the above mentioned, usable are materials capable of electrochemically doping/dedoping lithium ion, for example, conductive polymers such as polyacetylene, polythiophene and poly-paraphenylene; pyrolyzed carbons such as a carbon pyrolyzed in a gas phase in the presence of a catalyst; carbons produced by burning pitch, coke, tar and the like; carbons produced by burning polymers such as cellulose and a phenol resin; graphites (natural graphites, artificial graphites, expanded graphites and the like) capable of intercalatlng/deintercalating lithium ion; and inorganic compounds capable of doping/dedoping lithium ion such as $WO_2$, and $MoO_2$. These active materials may be used singly or as a composite of two or more thereof.

Of the above-mentioned negative electrode active materials, the pyrolyzed carbons, the carbons produced by calcining pitch, coke, tar and the like, the carbons produced by calcining polymers and graphites (natural graphites, artificial graphites, expanded graphites and the like) may be used for preparing secondary batteries preferable in battery characteristics (especially in safety).

Of the above-mentioned negative electrode active materials, where the negative electrode is formed of a conductive polymer, carbon, graphite or inorganic compound, the negative electrode may be formed by use of a mixture containing the negative electrode active material, an electric conductor and a binder.

Materials for the electric conductor are not particularly limited, and any material known In this field of art may be used. Examples thereof include carbons such as carbon black, acetylene black and Ketchen black, graphite powder (a natural graphite, an artificial graphite), metal powder and metallic fibers.

Materials for the binder are not particularly limited, and any material known in the field of art may be used. Examples thereof include fluoropolymers such as polytetrafluoroethylene and polyvinylidene fluoride, polyolefins such as polyethylene, polypropylene and ethylene-propylene-diene terpolymer, and styrenebutadiene rubber.

As the ion conductor, usable is an organic electrolyte liquid, a solid electrolyte (an inorganic or organic solid electrolyte), or a molten salt. Of these ion conductors, the organic electrolyte liquid may be used aptly.

The organic electrolyte liquid is composed of an organic solvent and an electrolyte.

The organic solvent is not particularly limited and any organic solvent known in the field of art may be used. Examples thereof include esters such as propylene carbonate, ethylene carbonate, butylene carbonate, diethyl carbonate, dimethyl carbonate, a methylethyl carbonate, γ-butyrolactone, methyl formate and methyl acetate, tetrahydrofuran, substituted tetrahydrofurans such as 2-methyltetrahydrofuran, ethers such as dioxolane, diethyl ether, dimethoxyethane, diethoxyethane and methoxyethoxyethane, and aprotic organic solvents such as dimethylsulfoxide, sulfolane, methylsulfolane and acetonitrile. These organic solvents may be used singly or as a mixture of two or more thereof.

The electrolyte is not particularly limited, and any electrolyte known in the field of art may be used. Examples thereof include lithium salts such as lithium perchlorate, lithium borofluoride, lithium phosphofluoride, arsenic lithium hexafluoride, lithium trifluqromethanesulfonate, a lithium halide and lithium chloroaluminate. These electrolytes may be used singly or as a mixture of two or more thereof.

The electrolyte liquid may be prepared by dissolving the electrolyte in the above-described organic solvent.

The inorganic solid electrolyte is not particularly limited, and any one known in this field of art may be used. For example, nitride, halides and oxygen acid salts of lithium are known. More particularly, $Li_3N$, $LiI$, $Li_3N—LiI—LiOH$, $Li_4SiO_4$, $Li_4SiO_4—LiI—LiOH$, $Li_3PO_4—Li_4SiO_4$, phosphorus sulfide compounds and $Li_2SiS_3$ may be mentioned.

The organic solid electrolyte is not particularly limited, and any one known in this field of art may be used. For example, a material composed of the above-described electrolyte and a polymer acting to dissociate the electrolyte and a material wherein a polymer carries an ion dissociation group are known. Examples of the polymer acting to dissociate the electrolyte include derivatives of polyethylene oxide, polymers containing such derivatives, derivatives of polypropylene oxide, polymers containing such derivatives and phosphate polymers. In addition, a polymeric matrix material containing the above mentioned aprotic polar solvent, a mixture of a polymer containing an ion dissociation group with the above mentioned aprotic electrolyte, and an electrolyte liquid to which polyacrylonitrile is added may also be mentioned.

The inorganic solid electrolyte and the organic solid electrolyte may be used together.

Usually the organic electrolyte liquid is preferably retained by a separator. As materials for the separator, nonwoven fabrics, woven fabrics and microporous materials of electrically insulative synthetic resin fibers, glass fibers, natural fibers and the like and formed pieces of alumina powder may be mentioned. Among these, nonwoven fabrics and microporous materials of synthetic resins such as polyethylene, polypropylene and the like are preferable because they are stable in quality. Some of these nonwoven fabrics and microporous materials of synthetic resins have an additional function of, when the battery abnormally heats, being melted by heat and making a block between the positive electrode and the negative electrode. Such fabrics and materials may be suitably used from the viewpoint of safety. The thickness of the separator is not particularly limited provided that It can retain a sufficient amount of the electrolyte liquid and prevent the positive electrode and the negative electrode from short-circuiting. It may usually be about 0.01 mm to about 1mm, preferably about 0.02 mm to about 0.05 mm, for example.

The nonaqueous secondary battery of the present invention may have any of a coin shape, a button shape, a sheet shape, a cylindrical shape, a cubic shape and the like. In the case where the battery has a coin or button shape, the battery is produced, in general, by forming the positive electrode and the negative electrode in pellets, putting them in a can, and sealing the can by caulking with intervention of an insulative packing.

In the case where the battery has a cylindrical or cubic shape, the battery is formed, in general, by inserting a sheet-form positive electrode and a sheet-form negative electrode in a can, electrically connecting the can and the sheets, pouring an ion electrolyte and sealing the can with a sealing plate with intervention of an insulative packing or with insulation byahermeticseal. At this time, a safety valve provided with a safety device may be used as the sealing plate. As the safety device, an overcurrent prevention element such as a fuse, a bimetal, a PTC element may be mentioned. Also, as measures for preventing rise of inner pressure of the battery can, adopted are methods of making a crack on a gasket, the sealing plate and the battery can. Further. an external circuit may be used which has an integrated countermeasure against overcharge and over discharge.

When the above-described battery is formed, the positive and negative electrode in the pellet or sheet form are preferably dried and dehydrated beforehand. As a drying and dehydrating method, a common method may be used. For example, a method of blowing heated air or low-moisture air to the positive and negative electrode, a method of exposing them under vacuum and a method of irradiating them with infrared, far-infrared and an electron beam may be mentioned. These methods may be used singly or as a combination. Temperature at drying and dehydration is preferably within the range of 50 to 380° C.

EXAMPLES

The present invention is now described In detail by way of example thereof It is noted that ethanol used in the following examples had a purity of 99.5%.

Example 1

Preparation of $LiNiO_2$

Starting compounds comprised of 0.03 moles of lithium nitrate and 0.03 moles of nickel nitrate hexahydrate (molar ratio of lithium to nickel is 1:1) were dissolved in 100 ml of ethanol and stirred. To the mixture, 0.045 moles of oxalic acid dehydrate in a powdery state was added and stirred at room temperature for two hours, thereby to produce a precipitate comprised of oxalates including a composite oxalate slightly soluble in alcohol from the starting compounds. The mixture was filtered off to isolate the precipitate, which was then dried. The resulting precipitate comprised of oxalates containing the slightly soluble composite oxalate was subjected to the major calcination at 700° C. in an atmosphere of 100% oxygen for 10 hours. The resulting calcined matter was pulverized to obtain a positive electrode active material, $LiNiO_2$.

Production of Positive Electrode

The above-mentioned positive electrode active material, $LiNiO_2$, was mixed with acetylene black and polytetrafluoroethylene in a mix ratio of 100:10:10 (by weight) in a mortar. Subsequently, the resulting mixture was pressure-formed. into a pellet having a diameter of 20 mm and containing 0.01 g of the active material. At that pressure-formation, a mesh of titanium which would act as a collector was also included in the mixture. A wire of titanium was taken out of the mesh of titanium and spot-welded to evaluation means, thereby to obtain a positive electrode for evaluation.

Evaluation of Positive Electrode

Evaluation was carried out by a three electrode method in which lithium was used as a counter electrode and a reference electrode. As an electrolyte, used was 1 mol/L of lithium perchlorate ($LiClO_4$) dissolved in a mixture solvent of 1:1 of ethylene carbonate and ethylmethyl carbonate. Lithium of the reference electrode was charged to 4.2V at a current density of 27.4 mA/g and then discharged to 2.7V at the same current density. Charge and discharge are repeated a number of times within the same potential range at the same current density.

As a result, an initial discharge capacity was 174 mAh/g.

Comparative Example 1

Preparation of $LiNiO_2$

Lithium hydroxide and Nickel oxyhydroxide (NiOOH) were weighed so that the molar ratio of lithium to nickel, Li:Ni. was 1.1:1, and mixed in a mortar. The mixture was formed into a pellet at a pressure of 100 kg/cm$_2$. This pellet was subjected to the major calcination at 800° C. in an atmosphere of 100% oxygen for two hours. The resulting calcined matter was pulverized to obtain a positive electrode active material, $LiNiO_2$.

Production and Evaluation of Positive Electrode

A positive electrode was produced and evaluated in the same manner as in Example 1. As a result, the initial discharge capacity was 124 mAh/g.

Comparative Example 2

Preparation of $LiNiO_2$

Lithium hydroxide, 0.20 moles, and nickel chloride, 0.20 moles, were weighed (the molar ratio of lithium to nickel, Li:Ni, was 1:1) and each dissolved in 100 ml of water to obtain aqueous solutions. The aqueous solution of lithium hydroxide was added to the aqueous solution of nickel chloride in five hours with stirring at 30° C. The resulting aqueous solution was dried at 90 to 100° C., and the resulting solid was pulverized and formed at a pressure of 100 kg/cm$^2$, thereby to produce a pellet. The pellet was subjected to the major calcination at 800° C. in an atmosphere of 100% oxygen for two hours. The resulting calcined matter was pulverized to obtain a positive electrode active material, $LiNO_2$.

Production and Evaluation of Positive Electrode

A positive electrode was produced and evaluated in the same manner as in Example 1. As a result, the initial discharge capacity was 120 mAh/g.

Comparative Example 3

Preparation of $LiNiO_2$

Lithium hydroxide and nickel hydroxide were weighed so that the molar ratio of lithium to nickel, Li:Ni, was 1:1, and mixed with a small amount of water as a dispersant in a mortar The resulting mixture was dried at 90 to 100° C. to obtain a solid. The solid was pulverized and formed at a pressure of 100 kg/cm$^2$ into a pellet. The pellet was subjected to the major calcination at 800° C. in an atmosphere of 100% oxygen for two hours. The resulting calcined matter was pulverized to obtain a positive electrode active material, $LiNiO_2$.

Production and Evaluation of Positive Electrode

A positive electrode was produced and evaluated in the same manner as in Example 1. As a result, the initial discharge capacity was 110 mAh/g.

Comparative Example 4

Preparation of $LiNiO_2$,

Lithium chloride, 0.20 moles, and nickel oxide (NiO), 0.20 moles, were weighed (the molar ratio of lithium to nickel, Li:Ni, was 1:1) and lithium chloride was dissolved in 100 ml of water to obtain an aqueous solution. The aqueous solution of lithium chloride was added to nickel oxide in five hours while kneading nickel oxide at 30° C. The resulting mixture was dried at 90 to 100° C. to obtain a solid. The solid was pulverized and formed at a pressure of 100 kg/cm$^2$ into a pellet. The pellet was subjected to the major calcination at 800° C. in an atmosphere of 100% oxygen for two hours The resulting calcined matter was pulverized to obtain a positive electrode active material, $LiNiO_2$.

Production and Evaluation of Positive Electrode

A positive electrode was produced and evaluated in the same manner as in Example 1. As a result, the initial discharge capacity was 127 mAh/g.

Comparative Example 5

Preparation of $LiNiO_2$

Lithium hydroxide anhydride, 0.60 moles, and nickel nitrate hexahydrate, 0.03 moles, were dissolved in 100ml of water and stirred. To the resulting mixture, 0.045 moles of oxalic acid in a powdery state were added and stirred at room temperature for two hours with co-precipitation. The resulting precipitate was filtered off and dried. The resulting precipitate was subjected to the major calcination at 700° C. in an atmosphere of 100% oxygen for 10 hours. The resulting calcined matter was pulverized to obtain a positive electrode active material, $LiNO_2$.

Production and Evaluation of Positive Electrode

A positive electrode was produced and evaluated in the same manner as in Example 1. As a result, the initial discharge capacity was 158 mAh/g.

Comparison of Example 1 with Comparative Examples 1 to 5 showed that according to the process of Example 1, a positive electrode active material having excellent initial discharge characteristics was able to be obtained .

Example 2

Precipitate comprised of oxalates containing a slightly soluble composite oxalate were obtained in substantially the same manner as in Example 1 except that lithium nitrate and nickel nitrate were weighed so that the molar ratio of lithium to nickel, Li:Ni, was 0.5:1, 1.0:1, 1.1:1, 1.5:1 and 2.5:1. The molar ratio of lithium to nickel in the resulting precipitates comprised of oxalates containing a slightly soluble composite oxalate was determined with an ICP emission spectroscopy. The respective molar ratios of lithium to nickel, Li:Ni, were 0.48:1, 1.02:1, 1.10:1, 1.46:1 and 2.47:1. The results showed that the resulting prerecipitates comprised of oxalates containing a slightly soluble composite oxalate had molar ratios close to those of the starting material.

Example 3

The production of the precipitate comprised of oxalates containing a slightly soluble composite oxalate of Example 1 was repeated three times. The resulting precipitates comprised of oxalates containing a slightly soluble composite oxalate were determined with regard to the molar ratio of lithium to nickel with the ICP emission spectroscopy. The molar ratios in the precipitates were 0.98:1, 1.02:1 and 1.01:1.

The above precipitates comprised of oxalates containing a slightly soluble composite oxalate were subjected to the major calcination as in Example 1, to produce positive electrode active materials. Positive electrodes were produced from the active materials and evaluated as in Example 1. The initial discharge capacities of the positive electrodes were 176 mAh/g, 175 mAh/g and 173 mAh/g.

Example 4

Filtrate which was obtained when the precipitate comprised of oxalates containing a slightly soluble composite oxalate of Example 1 was filtered off was distilled to separate ethanol. Ethanol thus obtained was used for producing a positive electrode active material and a positive electrode as in Example 1 and the positive electrode was evaluated. The initial discharge capacity was 176 mAh/g.

Examples 2 to 4 showed that it became easy to control the ratio of lithium to nickel in the precipitate comprised of oxalates containing a slightly soluble composite oxalate, that the uniformity of the precipitate was improved, and that the Initial discharge characteristic of the positive electrode active material after calcination was able to be stabilized. It was also found that the alcohol obtained from the filtrate could be used again and therefore that the production costs could be reduced.

Example 5 to 13
Preparation of $LiNiO_2$

Starting compounds composed of 0.33 moles of lithium nitrate and 0.30 moles of nickel nitrate hexahydrate (the molar ratio of lithium and nickel, Li:Ni, was 1.1:1) were dissolved in 1000 ml of ethanol and stirred. To the mixture, added were 0.465 moles of oxalic acid dihydrate in a powdery state and the resulting mixture was stirred at room temperature for two hours, thereby to produce a precipitate comprised of oxalates containing a composite oxalate slightly soluble in alcohol from the starting compounds. The mixture was filtered off to isolate the precipitate, which was then dried. The precipitate was subjected to the major calcination for five hours in an atmosphere of 100% oxygen at varied temperatures of 600, 650, 700, 750, 800, 850, 900, 940 and 980° C. The resulting calcined matters were pulverized to obtain positive electrode active materials, $LiNiO_2$. These active materials are referred to as Examples 5 to 13, respectively.

Production and Evaluation of Positive Electrodes

Positive electrodes were produced in substantially the same manner as in Example 1 except that the ratio of the positive electrode active materials, acetylene black and polytetrafluoroethylene was 100:8: 10.

The positive electrodes were evaluated in substantially the same manner as in Example 1 except that the electrolyte was 1 mol/L of lithium perchlorate ($LiClO_4$) dissolved in a mixture solvent of 1:1 of ethylene carbonate and diethylcarbonate.

Figure 1:
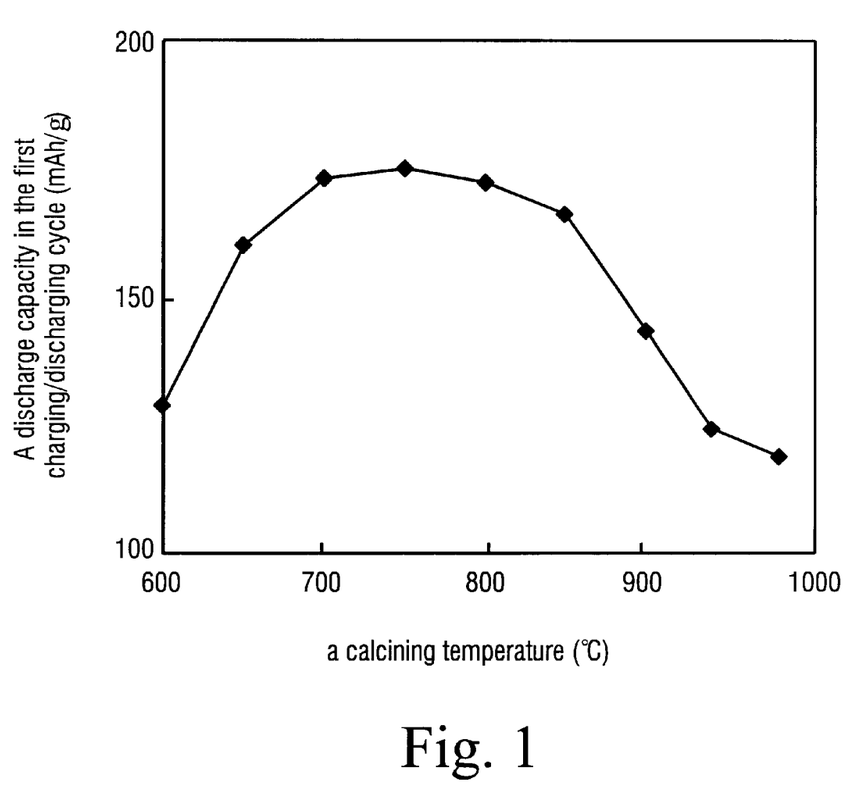
FIG. 1 is a graphical representation illustrating the relationship between an initial discharge capacity and calcination temperatures in Examples 5 to 13 in accordance with the present invention.

FIG. 1 is a graphical representation illustrating relationship between the initial discharge capacity and the major calcination temperature. FIG. 1 shows that the major calcination temperature is preferably within the range of 650 to 900° C. more preferably 700 to 850° C.

Examples 14 to 22.
Preparation of $LiNi_{0.8}Al_{0.2}O_2$

Starting compounds comprised of 0.30 moles of lithium nitrate, 0.24 moles of nickel nitrate hexahydrate and 0.06 moles of aluminum nitrate nonahydrate (the molar ratio of lithium, nickel and aluminum, Li:Ni:Al, was 1:0.8:0.2) were dissolved in 1000 ml of ethanol and stirred. To the mixture, added was oxalic acid in a powdery state and the resulting mixture was stirred at room temperature for two hours, thereby to produce a precipitate comprised of oxalates containing a composite oxalate slightly soluble in alcohol from the starting compounds. The mixture was filtered off to isolate the precipitate, which was then dried. The resulting precipitate was subjected to the major calcination for 10 hours in an atmosphere of 100t oxygen at temperatures of 600, 650, 700, 750, 800, 850, 900, 940 and 980° C. The resulting calcined matters were pulverized to obtain positive electrode active materials, $LiNi_{0.8}Al_{0.2}O_2$.

These positive electrode active materials are referred to as Examples 14 to 22, respectively.
Production and Evaluation of Positive Electrodes Positive electrodes were produced in substantially the same manner as In Example 1 except that the ratio of the positive electrode active materials. acetylene black and polytetrafluoroethylene was 100:8 10.

The positive electrodes were evaluated in substantially the same manner as in Example 1 except that the electrolyte was 1 mol/L of lithium perchlorate ($LiClO_4$) dissolved in a mixture solvent of 1:1 of ethylene carbonate and diethylcarbonate.

Figure 2:
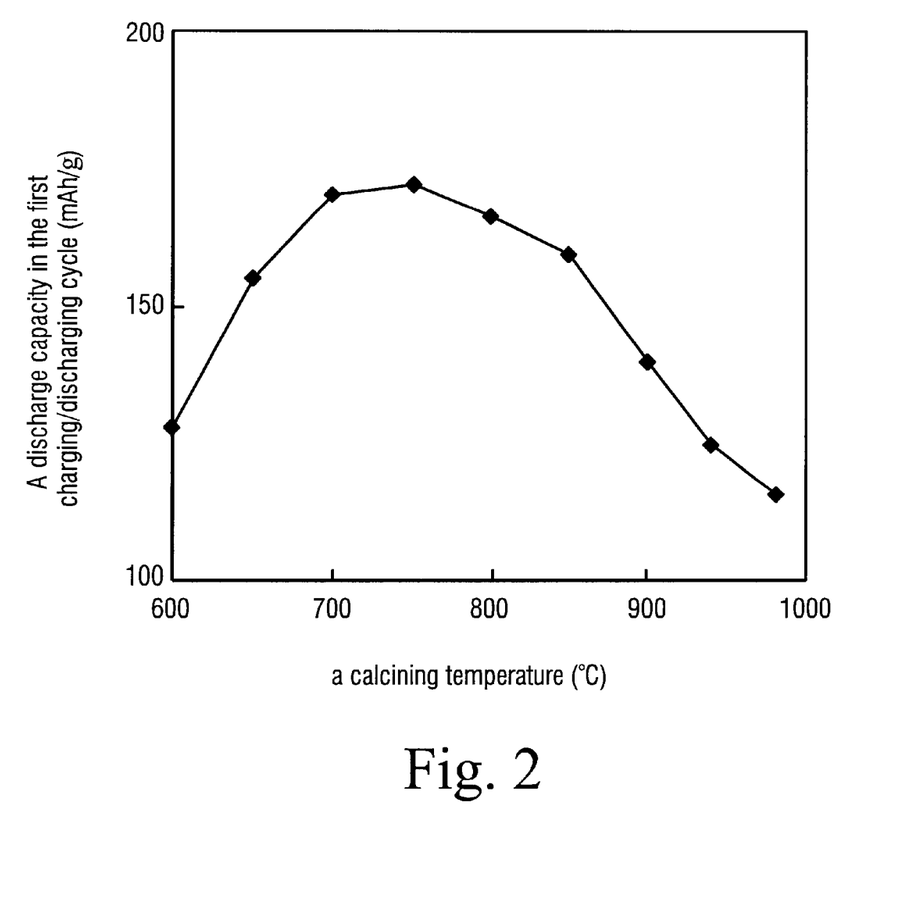
FIG. 2 is a graphical representation illustrating the relationship between an initial discharge capacity and calcination temperatures in Examples 14 to 22 in accordance with the present invention.

FIG. 2 is a graphical representation illustrating relationship between the initial discharge capacity and the major calcination temperature.

FIG. 2 shows that the major calcination temperature is preferably within the range of 650 to 900° C., more preferably 700 to 850° C.

Examples 23 to 29
Preparation of $LiNiO_2$

Starting compounds comprised of 0.10 moles of lithium acetate dehydrate and 0.10 moles of nickel acetate hexahydrate (the molar ratio of lithium to nickel, Li:Ni, was 1:1) were dissolved in 1000 ml of ethanol and stirred. To the mixture, added was oxalic acid which was dissolved in an alcohol and the mixture was stirred at room temperature for two hours, thereby to produce a precipitate comprised of oxalates containing a composite oxalate slightly soluble in alcohol from the starting compounds. The mixture was filtered off to isolate the precipitate, which was then dried. The resulting precipitate was subjected to the major calcination at 700° C. for eight hours in atmospheres of nitrogen and oxygen having oxygen concentrations of 10, 30, 50, 70, 80 and 100% and in an atmosphere of air (the oxygen concentration was about 20%). The resulting calcined matters were pulverized to obtain positive electrode active materials, $LiNiO_2$.

The active materials are referred to as Examples 23 to 29, respectively.

Production and Evaluation of Positive Electrodes

Positive electrodes were produced in substantially the same manner as in Example 1 except that the ratio of the positive electrode active materials, acetylene black and polytetrafluoroethylene was 100:15: 8.

The positive electrodes were evaluated in substantially the same manner as in Example 1 except that the electrolyte was 1 mol/L of lithium phosphofluorlde ($LiPF_6$) dissolved in a mixture solvent of 1:1 of ethylene carbonate and diethylcarbonate.

Figure 3:
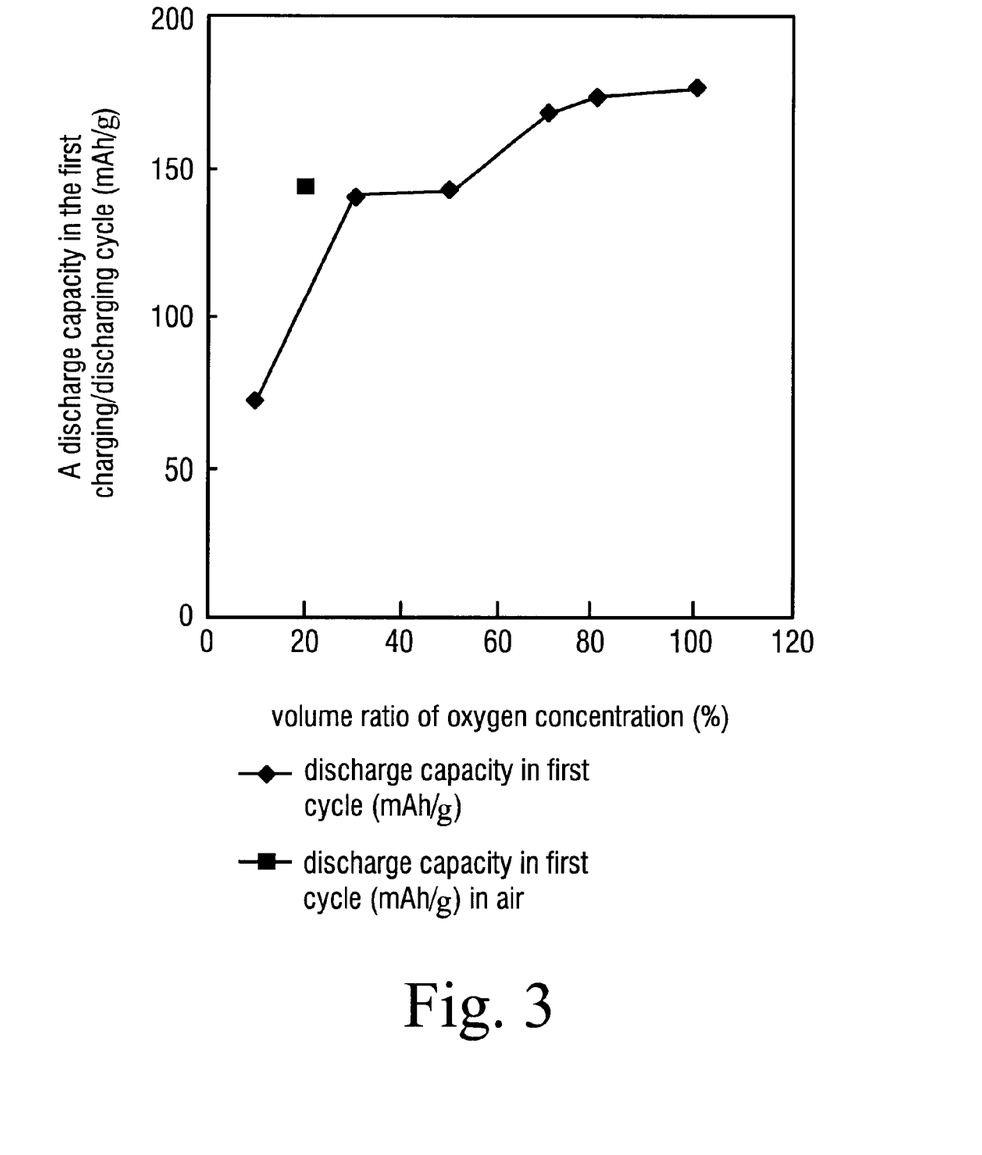
FIG. 3 is a graphical representation illustrating a relationship between an initial discharge capacity and concentrations of oxygen in calcining atmosphere In Examples 23 to 29 in accordance with the present invention.

FIG. 3 is a graphical representation illustrating relationship between the initial discharge capacity and concentrations of oxygen in calcining atmosphere, FIG. 3 shows that the concentration of oxygen in the calcining atmosphere is preferably that in air or within the range of 21 to 100%, which is higher than the ratio by volume of oxygen in the atmosphere, more preferably within the range of 50 to 100%, Example 30

Preparation of Positive Electrode Active Material and Production of Positive Electrode A positive electrode active material, $LiNiO_2$, and a positive electrode in a pellet form of 15 mm diameter containing 50 mg of the active material were produced in the same manner as in Example 1.

Production of Negative Electrode

A substrate of nickel (having a surface area of 4 $cm^2$) was used as a collector. A negative electrode was produced by depositing a pyrolyzed carbon as a negative electrode active material on the collector, the pyrolyzed carbon being obtained as a starting material by an atmospheric gas-phase pyrolysis. The pyrolyzed carbon was deposited under a temperature of 750° C. for two hours. The pyrolyzed carbon was found by X-ray diffractometry to have an interpolar distance $d_{002}$ of 0.337 nm on plane (002) and a thickness of crystallite Lc of 15 nm in the direction of the plane (002) and by argon laser Raman spectroscopy to have an R value of 0.45. The R value is a ratio of intensity of a peak around 1360 $cm^{-1}$ to intensity of a peak around 1580 $cm^{-1}$. A wire of nickel was spot-welded to the substrate of nickel for taking out collected electricity. The substrate was dried at 200° C. under vacuum for removing moisture, thereby to obtain a negative electrode. The weight of the active material in the negative electrode was 35 mg.

Evaluation of Battery

For evaluation of a battery, a beaker-form cell was used and the positive and negative electrodes produced as above were used. The electrolyte was 1 mol/L of lithium perchlorate dissolved in a mixture solvent of 1:1 of propylene carbonate and diethyl carbonate. For a charge/discharge test, the battery was first charged to 4.4 V at a current of 0.2 mA and then discharged to 2.5 V at the same current. Charge and discharge was repeated over and over within the same range of voltage and at the same current density from the second charge and discharge in order to evaluate the battery.

The first discharge capacity of the battery was 8.0 mAh, and the 100th discharge capacity of the battery was 7.3 mAh.

Example 31

Preparation of Positive Electrode Active Material and Production of Positive Electrode A positive electrode active material, $LiNiO_2$, and a positive electrode in a pellet form of 15 mm diameter and 0.75 mm thickness which contained 0.2 g of the active material were produced in the same manner as In Example 1.

Production of Negative Electrode

Natural graphite from Madagascar (in a scale form: particle diameter was 11 μm; $d_{002}$ was 0.337 nm; Lc was 27 nm; La was 17 nm; R value was 0; specific surface area was 8 $m^2$/g) was used as a negative electrode active material. The negative electrode active material was mixed with polytetrafluoroethylene in a mixing ratio of 10:1. The mixture was pressure-formed into a pellet of 15 mm diameter and 0.59 mm thickness which contained 0.1g of the active material. At the pressure-formation, a mesh of nickel which would act as a collector was included. The pellet was dried at 200° C. under vacuum for removing moisture, thereby to obtain a negative electrode.

Assembly of Battery

Figure 4:
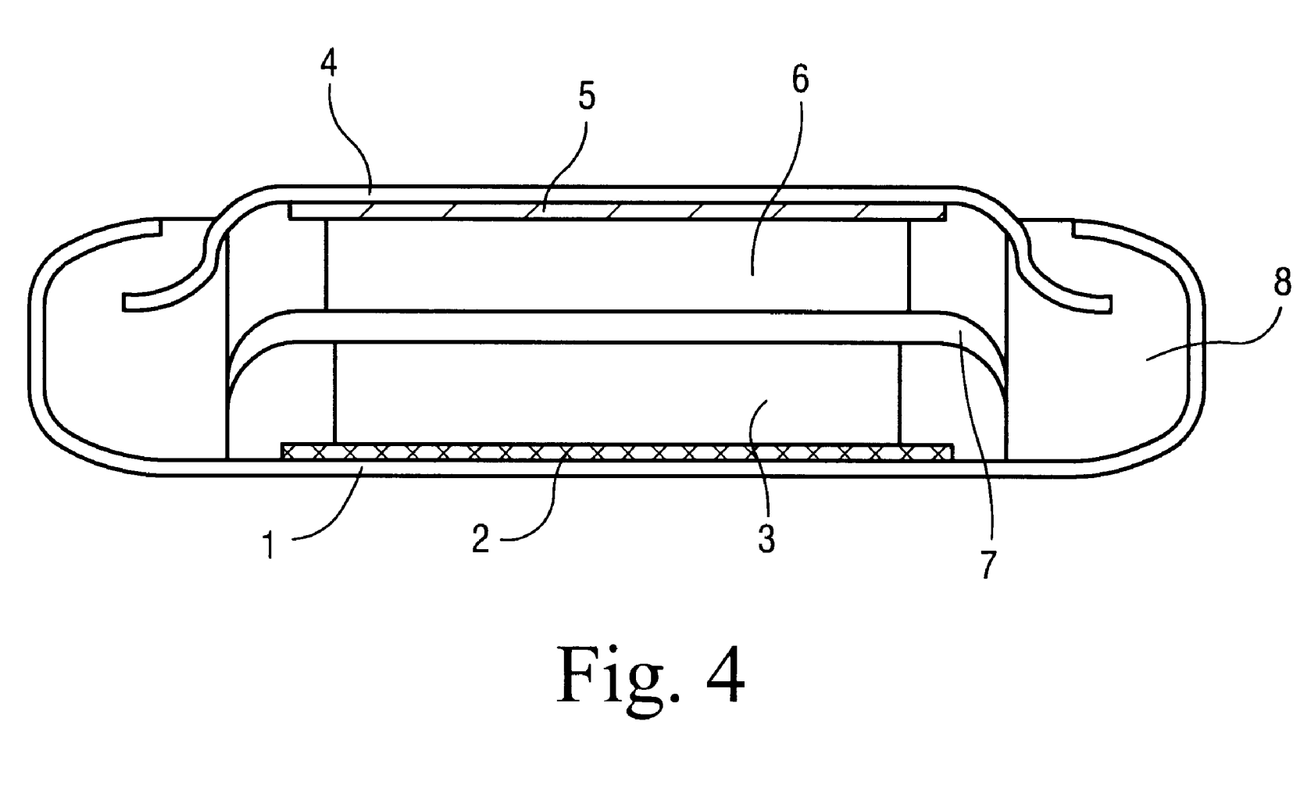
FIG. 4 is a schematic sectional view illustrating a coin-shape battery used in Example 31 in accordance with the present invention.

As shown In FIG. 4, the positive electrode containing a positive electrode collector 2 was contact-bonded to a positive electrode can 1 provided with an insulating packing 8. Subsequently, a separator 7 of nonwoven polypropylene was placed thereon. The separator was Impregnated with an electrolyte comprised of 1 mol/L of an electrolytic salt $LIPF_6$ dissolved in a mixture solvent of ethylene carbonate, propylene carbonate and diethyl carbonate in a mixing ratio of 2:1:3 by volume. On the other hand, for contact-bonding the negative electrode 6 containing a negative electrode collector 5 to the inside surface of a negative electrode can 4, the negative electrode 6 was placed on the separator 7. Then the positive electrode can 1 and the negative electrode can 4 were caulked with intervention of the insulating packing 8 and sealed. Thus a coin-type battery was produced.

Evaluation of Battery

The produced coin-type battery was charged up to an upper charge limit of 4.4 V at a charge/discharge current of 1 mA and subsequently discharged to a lower discharge limit of 2.5V. For evaluation, the battery was tested on its discharge capacity. This charge and discharge were repeated over and over within the same range of voltage at the same current density from the second charge and discharge in order to evaluate the battery.

The discharge capacity at the first cycle was 28.4mAh and the discharge capacity at the 100th cycle was 25.7 mAh.

Example 32

Figure 5:
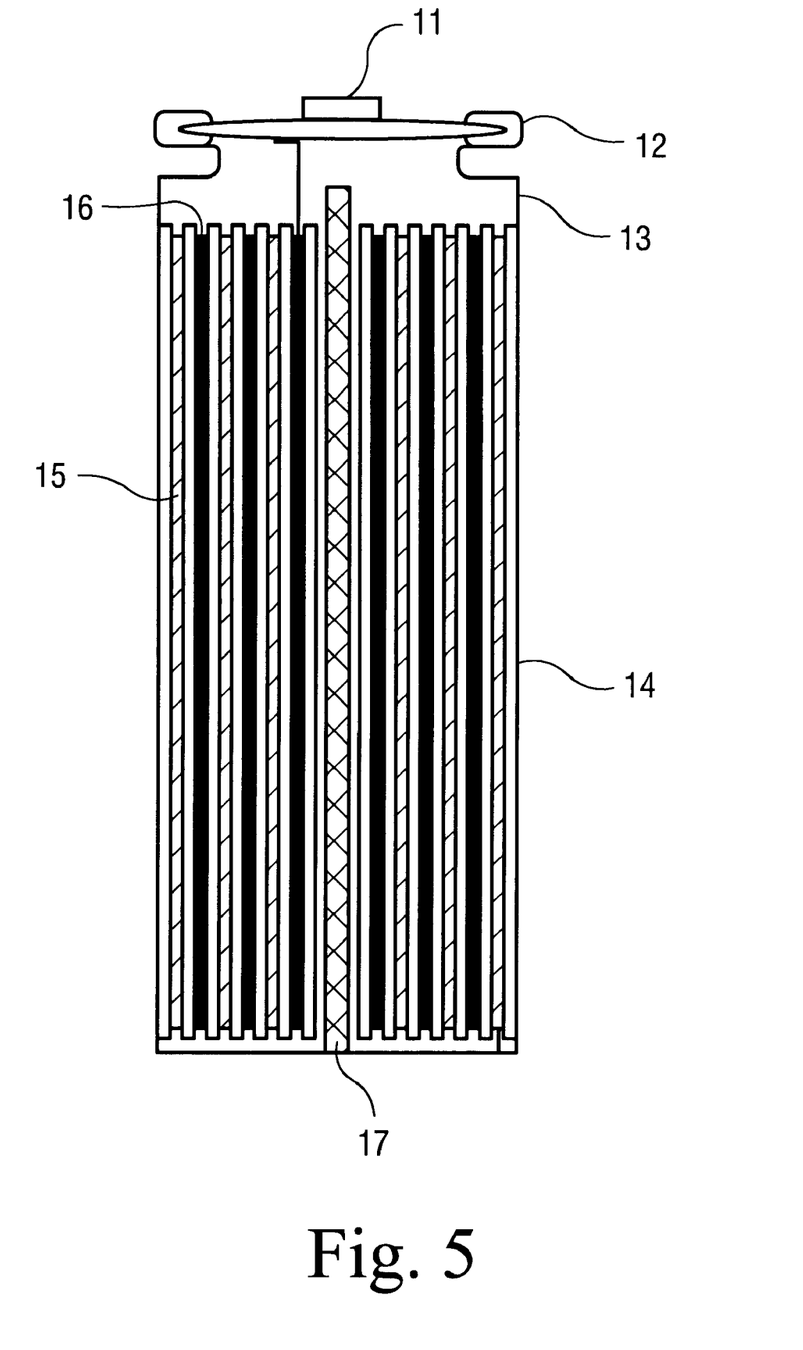
FIG. 5 is a schematic sectional view illustrating a cylinder-shape battery used in Example 32 in accordance with the present invention.

A cylindrical battery as shown in FIG. 5 was produce as follows.

For a positive electrode, 100 parts by weight of a positive electrode active material $LiNiO_2$ produced as in Example 1, 7 parts by weight of powdery acetylene black as a conductor and 10 parts by weight of polyvinylidene fluoride as a binder were mixed with N-methyl-2-pyrrolidone as a dispersant, to obtain a paste for forming the positive electrode. The paste for forming the positive electrode was applied onto both faces of a collector of aluminum foil of 20 μm thickness, followed by drying. The aluminum foil was subjected to rolling and cut into strips. A tab of aluminum as a positive electrode lead was spot-welded to an end portion of the separate strip. Thus a positive electrode 16 was obtained. The positive electrode active material was contained in the positive electrode in a ratio of 40 mg/$cm^2$.

For a negative electrode, 100 parts by weight of an artificial graphite (particle diameter was 8 μm; $d_{002}$ was 0.337 nm; Lc was 25 nm; La was 13 nm; R value was 0; specific surface area was 12 $m^2$/g) as a negative electrode active material and 10 parts by weight of polyvinylidene fluoride as a binder were mixed with N-methyl-2-pyrrolidone as a dispersant, to obtain a paste for forming the negative electrode. The paste for forming the negative electrode was applied onto both faces of a collector of copper foil of 18 μm thickness, followed by drying. The copper foil was subjected to rolling and cut into strips. A tab of nickel as a negative electrode lead was spot-welded to an end portion of the separate strip. Thus a negative electrode 15 was obtained. The negative electrode active material was contained in the negative electrode in a ratio of 20mg/cm².

The positive electrode 16 and the negative electrode 15 were arranged in an opposed relation with intervention of a porous separator 14 of polyethylene and spirally wound to form a wound element. This wound element was placed in a battery can 13 (of 17 mm diameter and 50 mm height, made of stainless steel) with the positive electrode lead and the negative electrode lead upward and downward, respectively. The negative electrode lead was spot-welded to the bottom of the battery can 13 and the positive electrode lead was spot-welded to a positive electrode cap 11 with a safety valve. A center pin 17 (a tube of stainless steel of 3.4 mm diameter and 40 mm length) was inserted in the center of the wound element for preventing wind shifting. Subsequently, an electrolyte of lithium phosphofluoride dissolved in a ratio of 1 mol/L in a mixture solvent of 1:1 of ethylene carbonate and diethyl carbonate was poured into the battery can, and the positive electrode cap 11 was gaulked with intervention of an insulating packing 12. Thus produced was a cylindrical battery.

The charge/discharge test was carried out in a constant temperature bath at 25° C. by charging in a constant current and constant method at a discharge current of 500 mA and at an upper limit voltage of 4.2 V for three hours and discharging in a constant current method at a discharge current of 100 mA and at a lower limit voltage of 2.75 V.

As a result, the initial discharge capacity was 916 mAh and the battery capacity after 50 cycles was 810mAh.

According to the process for producing a positive electrode active material of the present invention, obtainable is a precipitate comprised of oxalates containing a slightly soluble composite oxalate in which lithium and nickel are uniformly mixed. As a result, a positive electrode active material produced by use of the precipitate comprised of oxalates containing the slightly soluble composite oxalate exhibits a discharge capacity of about 175 mAh/g while at the same time exhibiting excellent charge/discharge characteristics and cycle characteristics. Further. since alcohol used for producing the precipitate comprised of oxalates containing the slightly soluble composite oxalate can be recycled for use a large effect can be expected from the viewpoint of costs.

Further, a nonaqueous secondary battery using the positive electrode active material obtained by the process of the present invention has an improved performance compared with a battery obtained by the conventional process, and also reduction of costs is possible.

What is claimed is:

1. A process for producing a positive electrode active material for a nonaqueous secondary battery, said process consisting essentially of the steps of:

(a) dissolving, in an alcohol as a medium, to form a solution a starting material which contains metals necessary for giving a compound represented by the formula $LiNi_{1-x}M_xO_2$, wherein $0 \leq x < 0.5$ and M is at least one metal selected from transition metals and 3B-, 4B- and 5B-group elements, as a positive electrode active material, and which is soluble in the alcohol;
   (b) adding a sufficient amount of oxalic acid to the solution of step (a) to produce a precipitate slightly soluble in alcohol and comprised of a composite oxalate containing lithium and nickel;
   (c) separating the slightly soluble precipitate from the solution of step (b); and
   (d) calcining the precipitate to obtain the positive electrode active material.

2. A process according to claim 1, wherein the alcohol is a lower aliphatic alcohol.

3. A process according to claim 2, wherein the alcohol is ethanol.

4. A process according to claim 1, wherein the starting material contains an inorganic or organic lithium compound and an inorganic or organic nickel compound.

5. A process according to claim 4, wherein the nickel compound is selected from the group consisting of nickel nitrate, nickel chloride and nickel acetate.

6. A process according to claim 4, wherein the lithium compound is selected from the group consisting of lithium nitrate, lithium chloride and lithium acetate.

7. A process according to claim 1, wherein calcination is carried out at a temperature of 650° C. to 900° C.

8. A process according to claim 1, wherein calcination is carried out in air or in an atmosphere containing 21% to 100% by volume of oxygen.

9. A process according to claim 1, wherein the alcohol is separated from the solution in step (c) after the precipitate is separated in step (c) and reused for producing a positive electrode active material.

10. A process according to claim 1, wherein oxalic acid is added in a molar ratio of 1.3 to 2.5:1 with respect to the sum of Ni and M.

11. A process according to claim 1, wherein, in the case where X is 0, a nickel compound and a lithium compound are used in such amounts that the molar ratio of nickel to lithium, Ni:Li, is 1:0.7 to 1:3.0.

12. A process according to claim 1, wherein a nickel compound, a lithium compound and a starting compound giving M are used in such amounts that the molar ratio of nickel and M to lithium, (Ni+M):Li, is 1:0.7 to 1:3.0.

13. A process according to claim 1, wherein the slightly soluble precipitate is a composite oxalate.

14. A nonaqueous secondary battery using a positive electrode including a positive electrode active material having an initial discharge capacity of at least 173 m Ah/g produced by a process as set forth in claim 1.

* * * * *